Jan. 1, 1935.  F. L. HOPFNER  1,986,774
WATER SOFTENER
Filed Dec. 14, 1931

Inventor
Ferdinand L. Hopfner
By
Attorney

Patented Jan. 1, 1935

1,986,774

UNITED STATES PATENT OFFICE 1,986,774

WATER SOFTENER

Ferdinand L. Hopfer, St. Paul, Minn., assignor of one-third to Arthur E. Lux, White Bear Lake, Minn., and one-third to William J. Lux, St. Paul, Minn.

Application December 14, 1931, Serial No. 580,932

1 Claim. (Cl. 210—24)

The present invention relates to a water softener and more particularly to a small, portable water softener for household or occasional use.

Various types of water softeners have been developed wherein the water to be softened is passed through a container having a chemical substance, such as zeolite, therein to remove impurities from the water, and such water softening mechanisms are in quite general use. However, with the construction of water softeners at present in use, it is necessary to have a comparatively large tank to contain the softening chemical and the cost of such mechanisms is comparatively high.

An object of the present invention is to make an improved, compact, portable water softening device.

In order to attain this object, there is provided, in accordance with one feature of the invention, a container having a screen positioned transversely thereof and spaced upwardly from the bottom of the container, and having a second screen positioned transversely of the container and spaced downwardly from the upper end thereof. A water inlet is provided below the lower screen and a water outlet is provided in the space above the upper screen.

Figure 1:
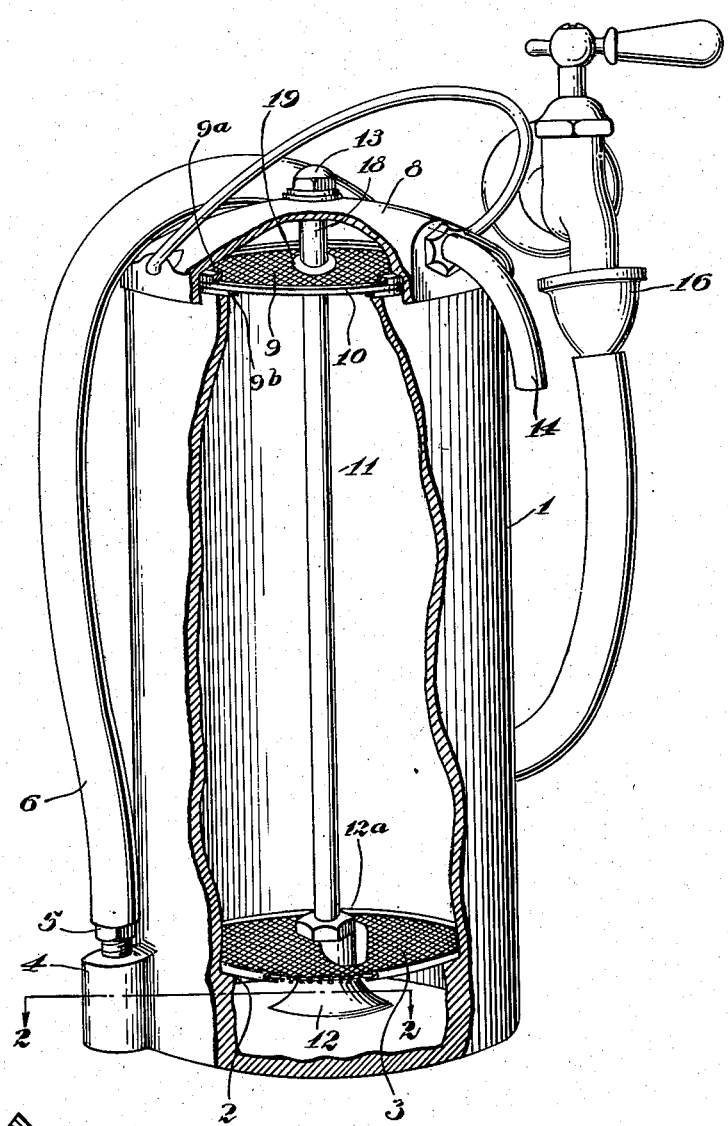
Figure 2:
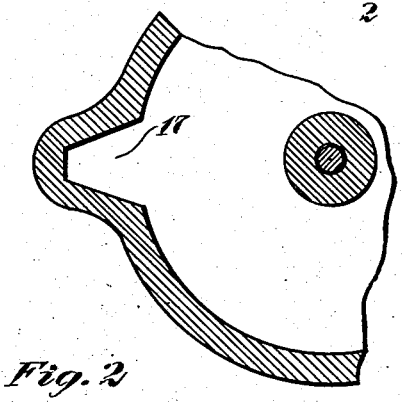

These and other features of the invention will be more fully brought out in the following description and accompanying drawing:

Figure 1 is a view in perspective of a water softener embodying the present invention connected to a water faucet, a portion of a container thereof being broken away to disclose the interior construction; and Figure 2 is a sectional view on line 2—2 of Figure 1.

Referring to the drawing in detail, a container 1 is constructed, preferably of cast aluminum, and is provided with an inwardly disposed shoulder 2 spaced upwardly from the bottom of the container to support a screen 3 thereon. This screen is preferably of two layers of mesh, the upper mesh being of fine weave to prevent the passage therethrough of particles of softening material, not shown, supported thereon, and the lower screen being of coarse weave to support the fine upper mesh. This double screen is adapted to have a close press fit with the walls of the container. The softening chemical used is preferably zeolite, which is a hydrated alumino-silicate having a specific gravity when dry, ordinarily of between forty-two and fifty per cent.

An offset 4 is provided adjacent the lower end of the container and is drilled and tapped on its upper side to threadedly receive a coupling 5 to which a flexible tube 6 is connected. A faucet coupling 16 is provided on the other end of said tube. A cored opening 17 is provided in the offset 4 from the drilled and tapped opening therein into the interior of the container below the shoulder 2, so that water flowing through the tube 6 will enter the container below the shoulder 2. This opening 17 is wider at its inner than at its outer end to spread the stream of incoming water and reduce the current thereof. A removable cover 8 is provided for the device and a fine mesh screen 9 is positioned on the upper rim of the container and is provided with a peripheral rim 10 which is adapted to be gripped between gaskets 9—a and 9—b, which are in turn adapted to be gripped between the cover member 8 and the upper rim of the container 1 to form a water-tight connection therewith. The screen 9 is mounted across the upper end of the container to retain the softening mineral below said screen. A rod 11 is provided centrally of the bottom of the container. A nut 12—a is threaded onto the rod 11 to hold the screen 3 tightly against the boss 12. A ferrule 18 is adapted to slip over the rod 11 above the screen 9 to rest on a washer 19 secured centrally of the screen 9 to prevent the escape of particles of the mineral softener at this point. A nut 13 screws onto the top of the rod 11 to hold the cover 8 firmly on the container and to force the cover downwardly to form a water-tight seal between the cover and the upper rim of the container. An outlet spout 14 is threadedly inserted in an opening drilled in the cover, said opening being in open communication with the interior of the cover.

It is necessary, in order for the present device to function properly, to have the quantity of zeolite used in the container accurately determined so that the grains of the zeolite when mined, suspended in water, will be slightly separated, but close enough together so that the water passing up through the softening mineral will be exposed to the softening action thereof. The proper amount of mineral is determined initially by experiment and calculation, and when once determined for a particular size of container, a definite amount of zeolite may be specified as a charge therefor.

One of the principal features of the present invention resides in the providing of the water compartment below the lower screen 3 so that the water coming in from the opening in the side will be discharged into the space below the screen and dissipate its force of flow in this space and will then seep upwardly through the screen with no definite directional current action, as such current action would cause the crystals or granules of the softening mineral to pack and thus greatly reduce the effectiveness of the device. The water seeping upwardly through the lower screen 3 gradually fills the container and surrounds the chemical softening substance and passes upwardly through the upward screen and outwardly through the spout 14. The chemical softening substance, as is well known, does not dissolve but causes a chemical transference with the elements causing the hardness of the water. This is known as a "base exchange" process and is so familiar to the art that it will be unnecessary to recite it in detail here. After the mechanism has been used a sufficient length of time so that the chemical softening particles have undergone this base exchange process to a point where they are no longer active, the particles may be restored to their original activity by running a strong brine solution through the device, which restores the chemical particles to their original chemical form and the device is again ready for use.

The device comprises a simple and effective portable water softening mechanism and by the novel arrangement of the parts thereof permits the device to be made on such a small scale as to be usable for domestic use, where a small or occasional quantity of softened water is desired.

I claim:

A portable water softener comprising a receptacle having a water inlet opening into the lower end thereof to discharge transversely thereof, a shelf extending inwardly from the wall of said receptacle above said inlet opening, a stud centrally of the bottom of said receptacle extending upwardly to the height of said shelf, a zeolite supporting screen supported on said shelf and said stud, a rod engaging said stud and projecting upwardly in said receptacle, a second screen mounted transversely of the top of said receptacle, a removable cover spaced upwardly from said second screen and having a discharge spout mounted therein, cover securing means engaging said rod to hold said cover in hermetically sealed position on said receptacle, and a flexible supply hose in open communication with said inlet opening, said hose having an end connection to connect said softener to a source of water supply.

FERDINAND L. HOPFNER.